United States Patent
Messenger

[11] 3,908,161
[45] Sept. 23, 1975

[54] FIELD EXCITATION SYSTEM FOR SYNCHRONOUS MACHINES UTILIZING A ROTATING TRANSFORMER BRUSHLESS EXCITER GENERATING COMBINATION

[75] Inventor: Lawrence Waters Messenger, Erie, Pa.

[73] Assignee: General Electric Company, Wilmington, Mass.

[22] Filed: Feb. 7, 1974

[21] Appl. No.: 440,516

[52] U.S. Cl. .................... 322/29; 290/38; 290/46; 322/59
[51] Int. Cl.² .................................... F02N 11/08
[58] Field of Search .............. 322/1, 29, 59, 60, 73, 322/63; 290/40, 46, 38, 52; 310/112, 113

[56] References Cited
UNITED STATES PATENTS

| | | | |
|---|---|---|---|
| 3,591,844 | 7/1971 | Schonebeck et al. | 290/52 X |
| 3,764,815 | 10/1973 | Habock et al. | 290/52 |

*Primary Examiner*—J. D. Miller
*Assistant Examiner*—Robert J. Hickey

[57] ABSTRACT

A field excitation system is provided for a synchronous machine which is operated both as a motor and as a generator. Field excitation is provided by a rotating machine which is connected as a brushless exciter when the synchronous machine is in the generating mode and connected as a rotating transformer when the synchronous machine is in the motoring mode. This conversion is achieved by selectively switching the field winding connections of the exciter/transformer and by switching the voltage applied to the field windings from DC to AC. When the main machine is to be operated in the motoring mode, a three-phase alternating voltage is applied to the exciter field winding and the field winding connections are switched so that the field windings are in a three-phase WYE connection and the machine functions as a rotating transformer. The alternating voltage induced in the rotor winding is rectified and provides field excitation for the main machine. As the main machine comes up to speed, a speed at which the machine is to be operated as a generator, the rotating machine is reconnected to operate as a brushless exciter generator. To this end, the field windings are connected in series, the three-phase alternating voltage is removed and a DC voltage is applied to the field windings. The exciter now operates as a standard inside-out synchronous exciter generator to generate a voltage in the armature rotor windings which is rectified to supply the DC field for the main machine rotor. In this fashion, DC excitation for the main synchronous machine is provided both when the machine is initially started from standstill in the motoring mode and when it switches to the generating mode.

8 Claims, 3 Drawing Figures

FIELD EXCITATION SYSTEM FOR SYNCHRONOUS MACHINES UTILIZING A ROTATING TRANSFORMER BRUSHLESS EXCITER GENERATING COMBINATION

The present invention relates to a control and excitation system for synchronous machines and more particularly, to a control system for a synchronous machine which is to be operated both in the generator and motoring mode.

A synchronous machine is a dynamoelectric machine which may be utilized as a motor for driving a shaft or any load at a constant speed or as a generator for producing a voltage at a predetermined frequency depending on the speed of the driving shaft. When the device is used as a synchronous generator, it is customary to provide field excitation for the rotor through a combination of a permanent magnet generator (PMG) and a synchronous brushless exciter generator. The output of the PMG is rectified to provide DC field excitation for the synchronous exciter generator. The exciter generator converts the DC stator field into a polyphase AC armature voltage which is rectified by a set of rotating rectifiers mounted on or within the driving shaft to provode the DC excitation for the field windings of the synchronous generator.

Under certain circumstances, it may be desirable to operate the main machine initially as a motor to drive a dynamic load such as a jet engine. After the jet engine ignites and comes up to idling speed, it then drives the synchronous machine as a generator to provide electrical power for the aircraft. One such starter motor/generator system which is capable of performing this dual function without modification of the synchronous machine as it switches from the motoring to the generating mode is described and claimed in an application assigned to the General Electric Company, the assignee of the present invention in an application Ser. No. 440,322 Docket (52-AY-E172) filed on Feb. 7, 1974 (contemporaneously with the instant application) in the name of David Logan Lafuze and entitled:

A Starter-Generator Electrical System Utilizing Phase Controlled Rectifiers to Drive a Dynamoelectric Machine as a Brushless D.C. Motor in the Starter Mode and to Provide Frequency Conversion for a Constant Frequency A.C. Output in the Generating Mode.

Operation of the machine as a motor and the subsequent conversion to generator can introduce a number of difficulties, particularly with respect to the excitation of the machine. If the machine is to be initially operated as a motor problems may exist in furnishing the main rotor flux from the source of DC current used to provide field excitation for exciter generator. That is, with the system in a generating mode, the exciter functions as an inside-out synchronous generator in which a DC field is applied to the field windings and a polyphase voltage is generated in the armature windings wound on the rotor. However, in the motoring mode, the machine is initially at a standstill so that a DC voltage applied to the field windings will not produce any AC woltage in the exciter armature winding. Hence, there is no excitation of the main machine field with a normal exciter connection. It is necessary, therefore, to convert the synchronous exciter generator with its DC field excitation to a rotating transformer which has its stationary primary winding excited from an AC supply. However, simply switching the supply voltage to remove DC field excitation and apply a single phase AC supply, which might seem like an obvious solution, is not a satisfactory approach since it introduces many problems. In the first instance, the exciter stator has its poles wound with DC windings of high number of turns for operation as a synchronous generator and any attempt simply to supply AC power, i.e., 400 Hz aircraft ground power, for example, results in a very large winding reactance which prevents any significant flow of current. Consequently, any attempt to operate the exciter as a rotating transformer results in very small transfer of energy across the air gap of the machine and a very low induced voltage in the rotor armature windings. Reducing turns in the field windings when the machine is in the rotating transformer mode would seem to be a possible, and seemingly obvious solution to the problem of large winding reactance. However, simply reducing the field winding turns, while it reduces the winding reactance introduces other difficulties which also reduce the output of the system. That is, the exciter armature windings are normally connected as a three-phase WYE with the phases electrically displaced by 120°. With a single phase AC voltage applied to the field windings, this vector relationship of the armature windings means that the position of the rotor would determine the amount of changing flux cut by the armature windings and, consequently, the output from each of the armature phases would be a function of the rotor position. This would result in an unbalanced output and would lower the main field current and hence, interfere with the proper operation of the main synchronous machine in the motoring mode. Thus, while it is possible to convert the exciter from a synchronous generator in the generating mode to a rotating transformer by applying a single phase alternating voltage to the field windings, while at the same time, reducing the number of turns in the field windings, this approach has serious shortcomings and is, hence, not the most desirable approach.

It has been found, that modifying the stator field winding connections so that they are reconnectable to a three-phase WYE in the motoring mode, the device can be utilized as a rotating transformer with maximum energy transfer across the air gap. The voltage induced in the rotor windings is high and when rectified supplies adequate field excitation for the main machine. After the machine has been brought to speed it is to be reconverted to the generating mode, the stator field windings are reconnected from a WYE to a series connection. Simultaneously, the supply voltage is removed and a DC voltage substituted so that the machine operates as an inside-out synchronous exciter generator. In this fashion, the machine functions to provide the normal field excitation for the main machine when it is in the generating mode by operating as a synchronous generator and is converted to a rotating transformer in the motoring mode by reconnecting the stator field windings to a three-phase WYE connection and supplying a three-phase alternating voltage. The three-phase AC supply establishes a rotating MMF wave in the air gap which induces a voltage in the three-phase WYE connecting armature windings on the rotor which voltage is rectified to supply the DC field for the main machine during the motoring mode.

It is therefore a primary objective of the instant invention to provide an excitation system for a synchronous machine in which field excitation is supplied for the main machine both during the generating and motoring mode of the main machine.

Another objective of the invention is to provide a field excitation system for a synchronous machine utilizing a rotating excitation source which is selectively reconnected to operate as a brushless exciter generator and as a rotating converter depending on the operating mode desired for the main synchronous machine.

Still another objective of the invention is to provide an excitation system for a synchronous machine in which the stator windings of the exciter for the machine are reconnected during the generating and motoring mode to provide a synchronous exciter generator and a rotating converter configuration respectively during these modes.

Other objectives and advantages of the invention will become apparent as the description thereof proceeds.

The various advantages and objectives of the invention are realized in an excitation system for a synchronous machine which may alternately be operated as a brushless DC motor or as a synchronous generator. Both during the brushless DC motor and synchronous generator mode of operation, DC field excitation for the synchronous machine is provided from an exciter which is selectively reconnected to function as a synchronous exciter generator when the main machine is a synchronous generator and as a rotating transformer when the main machine is operated as a brushless DC motor. When the main machine is operated as a brushless DC motor, DC field excitation for the main machine rotor is provided even though the rotor of the exciter is initially at standstill. To this end, the stator windings of the exciter are connected in three-phase WYE connection to operate as a rotating converter during the motoring mode. Furthermore, the stator windings are connected to a three-phase AC supply source. The three-phase AC excitation voltage and the three-phase WYE connection of the stator windings results in a rotating MMF wave in the air gap of the machine which induces an alternating voltage in the three-phase WYE connected armature rotor windings. This induced voltage is then rectified in a rotating rectifying bridge and applied as field excitation to the rotor of the main synchronous machine. Since the stator of the main synchronous machine has its windings selectively supplies with current from a suitable supply source, the synchronous machine operates as a DC brushless motor to drive a shaft and a load, such as a jet. When the synchronous machine operating as a brushless DC motor reaches a predetermined speed, which in the case of the machine acting as a starter for a jet engine may be the idling speed of the engine, the synchronous machine is converted from the motoring to the generating mode. A logic circuit responsive to a speed sensing element disconnects the AC power from the exciter stator windings and reconnects the three-phase WYE connected stator winding in series. Simultaneously, a source of DC voltage, which may be the rectified output of the PMG mounted on the machine shaft is connected to the stator windings of the exciter/converter to reconnect the machine to an inside-out synchronous exciter generator to supply field excitation voltage for the main machine which is now opeerating as a synchronous generator. In this fashion, the excitation system for the synchronous machine is rapidly and effectively converted to supply field excitation for the machine when it operates as a DC brushless motor in the starting mode, and when it operates as a synchronous generator when in the generating mode.

The novel features which are believed to be characteristic of this invention are set forth with particularity in the appended claims. The invention itself, however, both as to its organization and mode of operation, together with further objectives and advantages, may best be understood by reference to the following description taken in connection with the accompanying drawings in which:

Figure 1:
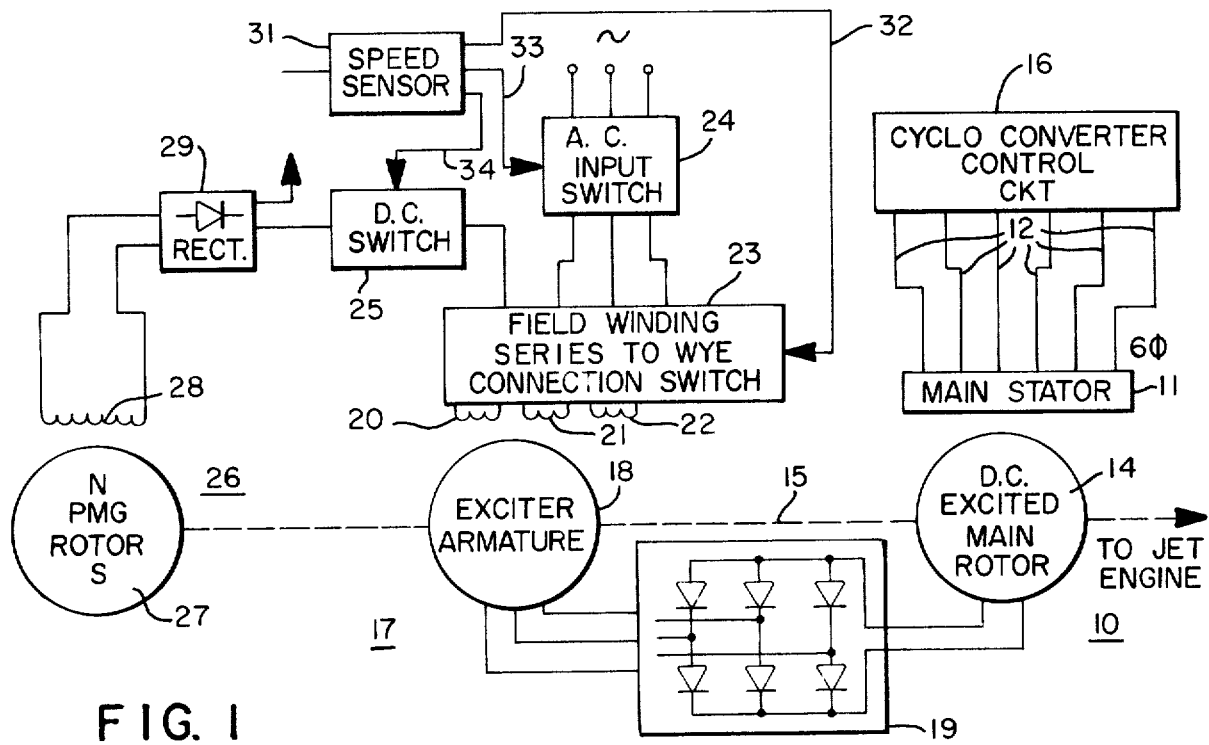
FIG. 1 is a schematic representation, partially in block diagram form, of the field excitation system for synchronous dynamoelectric machines, and the manner in which the brushless exciter is converted from a synchronous exciter generator to a rotating transformer to provide field excitation for the main machine both during motoring and generating modes.

FIG. 1 shows, in greatly simplified form, a self contained synchronous machine, including the control circuits therefor, which is capable of functioning both as a motor and a generator. When functioning as a motor, the synchronous dynamoelectric machine will operate essentially as a DC brushless motor and in the generating mode as a synchronous generator. The system includes the synchronous main machine 10 having a stationary armature winding 11 formed by six individual phase windings interconnected to provide a six phase output at leads 12. The generator further includes a DC excited main rotor 14 having suitable windings mounted on a rotatable shaft 15 shown in dotted lines which is coupled to a load such as a jet engine. In one mode of operation, namely as a brushless DC motor, the main synchronous machine 10 drives the jet engine from a standstill until ignition or lightoff and thereafter to the starting speed which is substantially the idling speed of the engine. When the engine reaches idling speed, the operating mode of the main synchronous machine is converted from a brushless DC motor to a synchronous generator which is thereafter driven by the jet engine.

The main stator 11 is connected to a cycloconverter or phase controlled network 16 which, during operation, as brushless DC motor, supplies current to the proper armature winding. To this end, rotor position must be sensed and a signal proportional to rotor position supplied to control circuit 16 so that the phase controlled switching devices, such as SCR's, in the control circuit are commutated at the proper time to supply current to the proper armature winding. Brushless DC motor circuits and the control circuits for selectively supplying current to the armature winding are well-known and one preferred form is illustrated in the previously referred-to Lafuze application. For example, the shaft position sensors may be Hall generator devices which respond to magnetic flux to produce a signal indicative of shaft position and hence, of the position of the main rotor. These signals are then utilized to control the solid state switching element such as an SCR in the control circuit to apply current to the main machine armature winding which has maximum flux associated therewith to produce the necessary torque for motoring.

In the generating mode, the six phase output from main winding 11 may be applied to any utilization circuit or alternatively, may be applied to a cycloconverter network for producing constant frequency output from the variable frequency output from the main stator. Frequency conversion circuits for achieving constant frequency outputs from a generator driven at a variable speed are also well-known and reference is hereby made to patents filed in the name of David Logan Lafuze and assigned to the General Electric Company, the assignee of the present invention for a description of such circuitry. Thus, the main armature windings are either connected to a control circuit which supplies the current to the windings in the proper sequence and in the proper time when the machine operates as a motor or, alternatively, to a utilization circuit or a variable speed constant frequency converter circuit which converts the generated voltage in the windings to a constant frequency output when the machine is in the generating mode.

Whether operating as a motor or generator, the field windings on the DC exciter main rotor 14 are connected to the armature windings 18 of an exciter 17 through a plurality of rectifiers shown schematically as a rectifier bridge 19 which may be mounted directly on the shaft or within it if shaft 15 is hollow. The rectified voltage from exciter armature 18 provides the DC excitation for field windings of main machine rotor 14. The stator of exciter 17 includes three windings, 20, 21 and 22 which are coupled through a field winding series to WYE connection switching arrangement 23 either to a source of alternating current through the AC input switch 24 or to a source of DC potential through a DC input switch 25. The DC field excitation for exciter 17 may be obtained from a permanent magnet generator (PMG) 26 which has permanent magnet rotor 27 which is mounted on shaft 15. Permanent magnet rotor 27 is designed to have a number of north-south pole pairs which equal the number of pole pairs of the main synchronous machine so that the permanent magnet generator may be utilized, in conjunction with a position sensing element such as a Hall probe, not shown, to function as the shaft position sensor for the main machine rotor during motoring operation. In addition, the PMG provides a source of voltage both for control purposes in the cycloconverter control circuit and for supplying DC voltage for the field windings of the exciter during the generator mode. To this end, a stationary armature winding 28 of PMG 27 is coupled through a rectifier shown schematically at 29 to produce a DC voltage which is coupled through DC input switch 25 to the exciter field connecting switch 23. The unidirectional output from rectifier 29 is also coupled through a lead 30 to the cycloconverter control circuit to provide control voltages for the cycloconverter. In addition, output signals from the position sensing Hall generators, not shown, positioned adjacent to the PMG rotor may also be applied to the cycloconverter to control switching of the solid state switching elements to apply current selectively to the main stator windings of the synchronous machine.

Field windings 20, 21 and 22 are selectively connected by switch 23 either in series, when the device operates as an inside-out synchronous exciter generator and in a three-phase WYE connection when the device operates as a rotating transformer during the motoring mode.

The DC and AC input switches 24 and 25 which respectively apply a DC and an AC energizing voltage to the exciter field windings as well as the field winding reconnecting switch 21 are controlled by a speed responsive network 31 which produces control signals that are applied over leads 32, 33 and 34 to the individual switches to control application of energizing voltage and connection of the stator windings.

Under normal operation, when the machine is initially energized in the motoring mode to drive a load, shaft 15 is not rotating and exciter 17 must be converted to a rotating transformer-converter to induce a voltage in exciter armature 17. The output from speed sensing network 31 is applied over lead 33 to actuate AC input switch 24 to apply a three-phase AC supply voltage to the stator winding and over lead 32 to field winding connection switch 23 to connect field windings 20–22 in a three-phase WYE connection. Simultaneously, an inhibit signal is applied over lead 34 to DC input switch 25 to disable that switch and disconnect the unidirectional supply voltage from rectifier 29 and PMG 26 from the field windings. The three phase AC voltage produces a rotating MMF wave in the machine air gap which induces a three-phase voltage in the WYE connected armature windings. This voltage is rectified to supply field excitation for the DC field windings of main machine rotor 14 even though the machine is initially at standstill. As main synchronous machine 10 operates as a motor and comes up to speed, a point will be reached when the load, such as the jet engine is driven at a speed which is sufficient to ignite the jet engine and to bring it up to starting or idling speed. At this point, the main synchronous machine must be switched from the motoring mode to the generating mode and simultaneously, exciter 17 must be converted from a rotating transformer to a synchronous exciter generator. Consequently, when the machine exceeds a given speed, the control signals from speed sensor 31 applied over leads 32 and 33 to AC input switch 24 and field winding reconnection switch 23 change so that an operation of AC input switch 23 is interrupted and the three phase AC energizing voltage is disconnected from the stator windings. Simultaneously, the control signal over lead 32 actuates field winding connection switch 23 to reconnect windings 20–22 in series. The inhibit signal applied over lead 34 to DC input switch 25 is terminated and DC switch now connects the unidirectional energizing voltage from rectifying bridge 29 to the field windings through reconnection switch 23. The DC voltage when applied to the series connected field windings applies a DC field to exciter 17 and the machine now operates as an inside-out synchronous exciter generator to produce a three-phase alternating voltage in the rotor armature windings. This voltage is rectified in bridge 19 and applied to the field windings of main machine rotor. The machine then operates as a synchronous generator to produce an output voltage having a frequency proportional to the speed of the shaft 15. The output voltage from stator 11 of the synchronous generator is, as pointed out previously, either connected directly to utilization circuit or, alternatively, to a variable speed constant frequency converter which produces a constant frequency output with varying input speeds.

Figure 2:
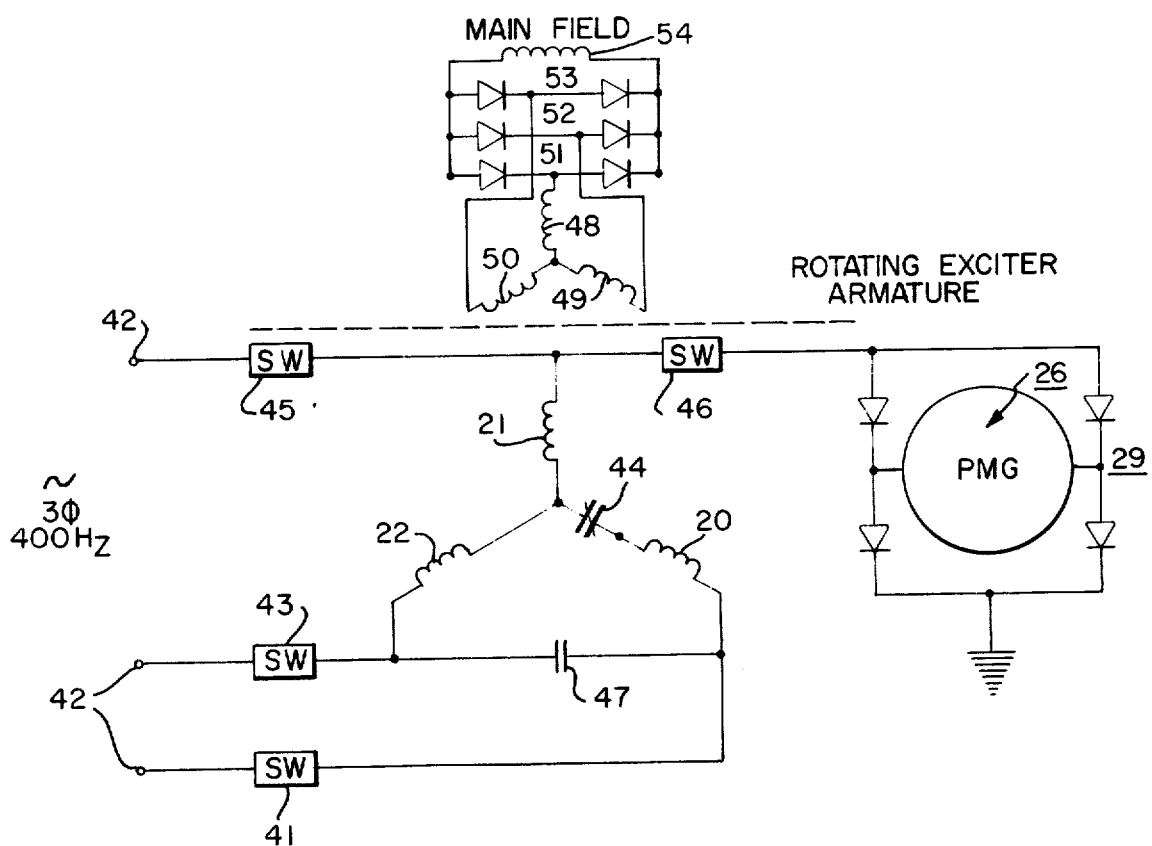
FIG. 2 is a schematic illustration of the rotor and stator connections of the exciter of FIG. 1 showing the manner in which the stator windings of the exciter are reconnected for operation in the separate modes.

FIG. 2 illustrates schematically the connection of the rotor and stator windings for exciter 16 and the interconnection between the alternating and DC supplied voltages. The field windings on the stationary armature of exciter 17 consist of the windings 20, 21 and 22. One end of winding 20 is connected through a switch 41 to one input terminal 42 of a source of alternating current, while the other end is grounded. One end of winding 22 is connected through switch 43 to a second AC input terminal 42 and its other end is connected to one end of winding 20 and through a normally closed switch to ground. The other end of winding 21 is connected through switch 45 to the remaining AC input supply terminal 42 and through switch 46 to the rectified output of PMG 26. The grounded end of winding 20 is thus connected through normally closed contact 44 to the junction of windings 21 and 22. Its ungrounded end is connected alternately to AC supply terminal 42 through switch 41 and to one end of winding 22 through normally open contact 47. With contactor 44 closed and contact 47 open, the grounded end of winding 20 is connected to the junction of windings 20 and 21 and the armature windings are connected in a three-phase WYE connection with the neutral grounded. Alternatively, whenever normally closed contact 44 opens and contact 47 closed, it will be seen that windings 20, 21 and 22 are connected in series between ground and the junction of switching elements 45 and 46.

Switches 41, 43, 45 and 46 are selectively controlled along with the contactors 44 and 47 so that switches 41, 43 and 45 are energized and switch 46 disabled to apply an AC supply voltage whenever contactor 44 is closed and contactor 47 is open. The stationary field windings are thus connected in three-phase WYE connection and with the AC voltage applied thereto, the device functions as a rotating transformer during the motoring mode of the main machine.

Whenever the device is to operate as an inside-out synchronous exciter generator during the main machine generating mode, contactor 44 is opened and contactor 47 is closed thereby reconnecting the windings in series. Simultaneously, switches 41, 43 and 45 are disabled, disconnecting the AC supply voltage while switch 46 is enabled thereby connecting the unidirectional voltage from the rectified output of the PMG to the series winding. Thus, when the main machine is in a generating mode, the field windings are connected in series and the DC voltage is applied to the field windings to provide field excitation for the exciter generator.

Rotor 18 of the exciter has a three-phase WYE connected armature winding comprising of the windings 48, 49 and 50. The voltages induced in the WYE connected rotor windings are coupled to a rectifying bridge arrangement comprising the series connected rectifier path 51, 52 and 53 which are respectively connected at their junctions to the windings 48, 49 and 50. The rectifying branches are usually rotating rectifiers mounted on the exciter shaft or inside of the exciter shaft and rectify the AC voltages induced in the rotor windings to supply the DC excitation for the main synchronous machine field shown generally at 54. The rectifiers are connected as a full wave, three-phase bridge with the rectifiers so poled so that one rectifier in each of the paths rectifies the positive alternation and the other rectifies the negative alternation thereby producing the DC excitation voltage for the main field.

Figure 3:
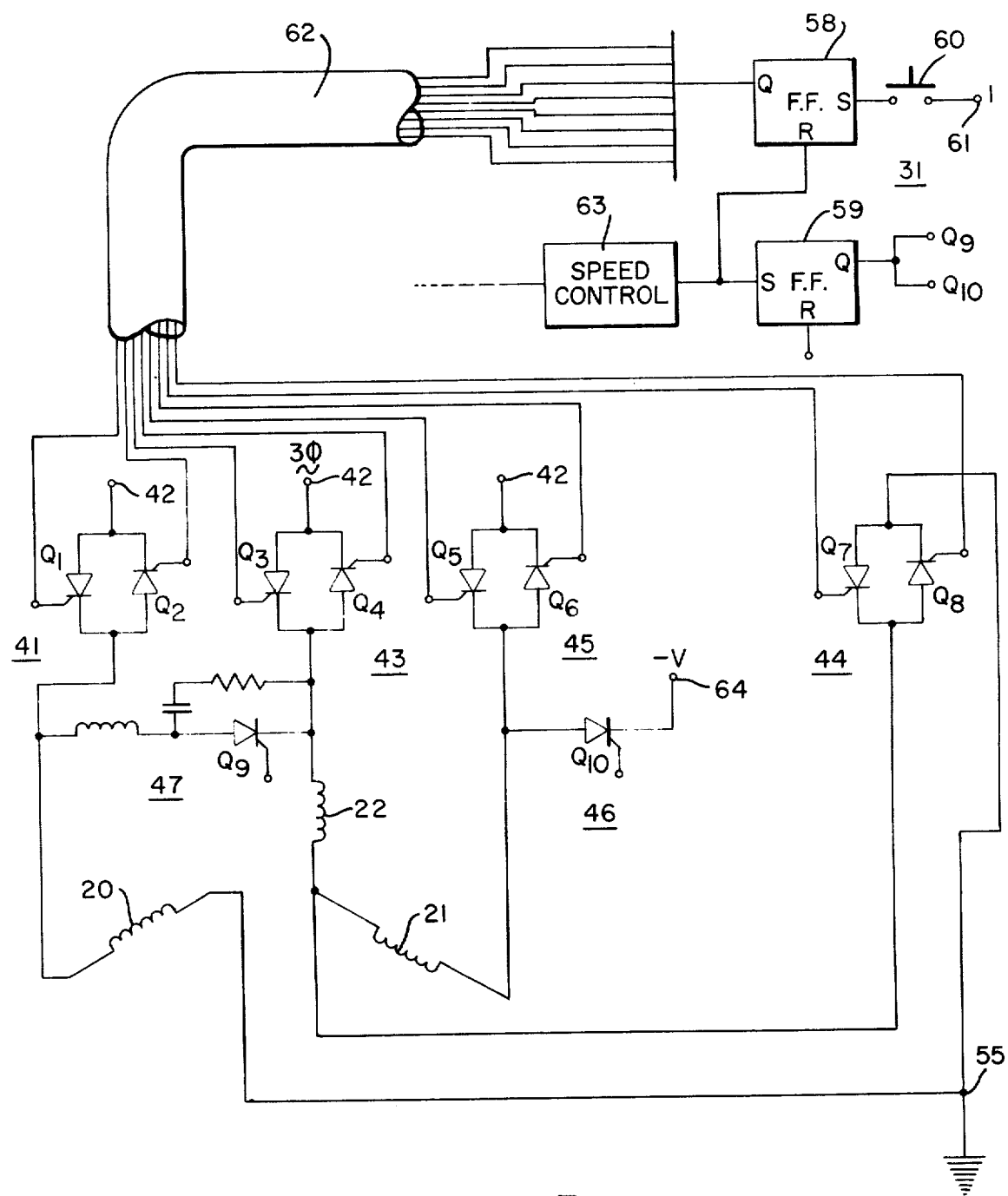
FIG. 3 is a block diagram showing the logic and control circuitry for switching the stator windings of the exciter and for connecting the AC and DC energizing voltages to the stator.

FIG. 3 shows a preferred embodiment of the circuitry for selectively applying the alternating and direct current energizing voltages to the field windings and also a preferred embodiment of the speed responsive circuitry for controlling the switches for applying the energizing voltages and for reconnecting the field windings. Thus, the field windings 20, 21 and 22 are connected to the three-phase AC input terminal 42 through the switching means 41, 43 and 45. The junction of windings 21 and 22 is connected to ground through the switch 44 and one end of winding 20 is connected to winding 22 through a normally open solid state switch 47. The unidirectional voltage, which may be the rectified output of the PMG generator is connected to winding 21 through a solid state switch 46.

Switches 41, 43 and 45 which connect the AC voltage to the windings consist of pairs of oppositely poled silicon controlled rectifiers $Q_1$–$Q_2$, $Q_3$–$Q_4$, $Q_5$–$Q_6$. The control electrodes of each of the silicon controlled rectifiers are connected to the output of the speed responsive control network 31 so that one of the SCR's in each pair conducts during the positive alternation of the AC supply voltage and the other one conducts during the negative alternation of the supply voltage. Thus, SCR's $Q_1$, $Q_3$ and $Q_5$ in switches 41, 43 and 45 are so poled that their anode to cathode paths are forward biased during the positive alternation whereas the anode to cathode paths of SCR's $Q_2$, $Q_4$ and $Q_6$ are forward biased during the negative alternations of the supply voltage. When the switches are to be actuated, a positive voltage is applied to the control electrodes of each of the SCR's so that one SCR fires during the positive alternation and the other one fires during the negative alternation of the AC supply voltage thereby connecting the input terminals 42 and the AC supply voltage to the windings.

Switch 44 is connected to the junctions of windings 21 and 22 and is thus in series with winding 22 and switch 43. That is, if switch 43 is actuated to supply AC energizing voltage to winding 22, the AC voltage is also applied to SCR's $Q_7$ and $Q_8$ thereby enabling switch 44. Switches 41, 43 and 44 and 46 are actuated together by the AC supply voltage and the triggering voltages applied to the control electrodes of the SCR's presently to be described, so that the ground terminal 55 is connected to the junction of windings 21 and 22 and the windings are in a three-phase WYE connection.

Winding 22 is also connected to one end of winding 20 through the solid state switch 47 consisting of the SCR $Q_9$ which has its cathode connected to winding 22 and its anode connected through a surge suppressing inductor 56 to winding 20. A series connected capacitor and resistor is connected in shunt with SCR $Q_9$. SCR $Q_9$ is selectively energized by applying a triggering voltage to its controlled electrode to connect the windings in series whenever the machine is to operate as a synchronous exciter generator. One end of winding 21 is connected through SCR $Q_{10}$ to a source of unidirectional voltage indicated as —V at the terminal. The normally open switch 47 and the normally open switch 46 are operated together so that $Q_9$ and $Q_{10}$ are driven into conduction during the generating mode to connect the windings in series and to apply DC field excitation to the exciter generator.

Speed responsive switching network 31 applies triggering voltages selectively to the silicon controlled rectifiers in each of the switching elements 41, 43, 44, 45, 46 and 47 so that switches 41, 43, 44 and 45 are operated together and switches 46 and 47 are operated as a pair. Speed responsive switching network consists of a first bistable multivibrator Flip-Flop 58 which controls SCR's $Q_1$–$Q_8$ and a second bistable multivibrator or Flip-Flop 59 which controls SCR's $Q_9$ and $Q_{10}$. Flip-Flop 58 has a set terminal which is connected through a normally open push button or starting switch 60 to a triggering voltage present at terminal 61. Thus, when the system is to be initially actuated so that the main synchronous machine is to operate as a motor and start a jet engine, for example, push button 60 is depressed momentarily applying a positive (or Logic one) voltage to the set terminal of Flip-Flop 58. This sets the Flip-Flop so that the voltage at its Q output goes to the high or Logic 1 level. The output from the Q terminal is applied over cable 62 and a plurality of control wires to the control electrodes of SCR's $Q_1$–$Q_8$. Thus, SCR's $Q_1$–$Q_8$ have positive triggering voltages applied to their control electrodes and these SCR's are driven into conduction during each alternation of the AC supply voltage applied at terminals 42. Actuation of SCR's $Q_1$ through $Q_6$ applies the AC voltage to the windings and actuation of $Q_7$ and $Q_8$ establishes a WYE connection for the windings so that the exciter operates as a rotating transformer. During this period, Flip-Flop 59 is in the state where its output Q terminal is in the low or Logic zero level so that SCR's $Q_9$ and $Q_{10}$ are deenergized and the DC voltages are disconnected from the windings and normally open switch 47, i.e., SCR $Q_9$ between winding 20 and 22 remains open. When the machine reaches a predetermined speed, a speed control network 63 which receives a signal from a speed sensing element produces an output pulse which is applied both to the reset terminal of Flip-Flop 58 and to the set terminal of Flip-Flop 59 reversing the states of these two Flip-Flops. Thus, the output pulse from the speed control network resets Flip-Flops 58 and the output at its Q terminal goes from a high or Logic one level to the low or Logic zero level thereby terminating the application of the triggering voltages to the control electrodes of SCR's $Q_1$–$Q_8$. As a result, whichever four SCR's of this group are conducting during the particular alternation of the AC voltage will become reverse biased as soon as the supply voltage polarity reverses, terminating conduction. The SCR's will not conduct during the next voltage alternation since no triggering voltages are applied to their control electrodes. Thus, switches 41, 43 and 45 which supply the three-phase AC voltage to the windings are disconnected while SCR's $Q_7$ and $Q_8$ of switch 44 are also disabled removing from the junction of windings 21 and 22.

Simultaneously, the output pulse from speed control network 63 sets Flip-Flop 59 so the output at its Q terminal goes from the low or Logic zero level to the high or Logic one level. This applies a triggering voltage to the control electrodes of SCR's $Q_9$ and $Q_{10}$. Since SCR $Q_{10}$ already has a voltage of the proper polarity applied to its cathode and anode path, the application of the contributing voltages control electrode drives it into conduction applying the unidirectional voltage to windings 21 and 22 and through these windings to the anode cathode path of SCR $Q_9$. Since SCR $Q_9$ also has a positive triggering voltage applied to its control electrode, $Q_9$ is driven into conduction and connects windings 20, 21 and 22 in series between ground terminal 55 and the DC supply voltage at terminal 64. It will be seen therefore, that the windings are now connected as a standard DC field winding and DC excitation is applied across the air gap of the exciter and the exciter now functions as an inside-out synchronous exciter generator which induces an alternating voltage in the WYE connected rotor windings of the exciter.

It is apparent therefore, that an exciter system for a synchronous machine has been provided which is capable of operating as a rotating transformer to supply excitation voltage for the main field winding of the synchronous machine when the synchronous machine is operated in the motoring mode. This is achieved reconnecting the field windings of the exciter as a WYE connected winding and by applying three-phase alternating voltage thereto to produce a rotating field in the air gap of the machine which induces an alternating voltage in the exciter rotor even at standstill which is rectified to supply excitation for the main field winding. When the main machine is to change its operating mode from motor to generator, the field windings of the exciter are reconnected in series, the three-phase alternating voltage is removed and a DC supply voltage is applied to the field so that a DC field is established across the air gap so that the machine now operates as an inside-out synchronous generator for supply field excitation to the main machine.

It will also be appreciated that the instant arrangement allows the system to supply excitation voltage for the main field winding during both operating modes in a simple and effective manner with a minimum change in the construction of the exciter machine in that the switching and control of the switchimg may be done externally of the machine where the field winding leads are brought out of the machine. Thus, many efficiencies can be realized in these excitation systems, while at the same time, allowing wide flexibility in the operating characteristic of the device.

While a particular embodiment of the invention has been illustrated and described, it will be apparent that various modifications thereof may obviously be made in the various instrumentalities and arrangements described without departing from the true spirit and scope of the invention as defined in the appended claims.

What is claimed as new and desired to be secured by Letters Patent of the United States is:

1. A dynamoelectric machine which is to be operated both as a D.C. brushless motor and as a synchronous generator and an excitation system therefor, the combination comprising:
   a. a dynamoelectric machine including
      1. a rotating field winding mounted on a shaft,
      2. stationary armature windings, means for applying alternating voltage to said armature windings when said dynamoelectric machine is operating as a D.C. brushless motor,
   b. an exciter mounted on the same shaft as the field windings of the dynamoelectric machine, said exciter including rotating armature windings and stationary field windings,
   c. means for rectifying the output from the rotating exciter armature windings to provide D.C. field excitation for the rotating field winding of said dynamoelectric machine both during operation of the dynamoelectric machine as a motor and as a synchronous generator, d. means for selectively operating said field as a rotating transformer when said dynamoelectric machine is operated as a motor to supply D.C. flux for said dynamoelectric machine when it operates as a motor and as an exciter generator when said dynamoelectric machine is driven as a generator to provide D.C. field excitation for the machine as a synchronous generator, said last named means including:

1. means for connecting said field winding in a polyphase connection and means for energizing the field winding with a polyphase A.C. signal to produce a flux wave in the air gap of said exciter to induce an alternating voltage in the armature windings when the dynamoelectric machine is operated as a motor said alternating voltage being rectified in said rectifying means to provide excitation for the field windings and D.C. flux for the dynamoelectric machine whereby said dynamoelectric machine functions as a motor to drive a load, and 2. means for changing the energization of the exciter field winding to establish a D.C. field across the exciter air gap to generate an alternating voltage in the armature winding when the dynamoelectric machine is driven as a generator including means for reconnecting all of the polyphase windings in series and means to impress a D.C. voltage across said series connected field whereby said exciter provides D.C. field excitation for the dynamoelectric machine during generator operation and also provides D.C. flux when the machine operates as a motor from standstill up to speed.

2. The excitation system according to claim 1 including means responsive to the speed of the dynamoelectric machine to switch the energization of the exciter field windings when the dynamoelectric machine reaches a predetermined speed at which its mode of operation is to be converted from motoring to generating.

3. The excitation system according to claim 1 wherein said exciter field windings are connected in a three phase WYE connection and have a three phase excitation voltage applied thereto 4. The excitation system according to claim 1 including a plurality of switch means coupled between said polyphase field windings and a source of polyphase voltage, further switch means to connect a DC voltage to said windings, and means to actuate said plurality of switch means and to disable said further switch means when said dynamoelectric machine is operated as a motor and means to disable said plurality of switches and enable said further switch means when the dynamoelectric machine reaches a predetermined speed whereby the polyphase voltage is disconnected and the DC voltage is connected to the field windings during the generating mode.

5. The excitation system according to claim 4 wherein said switch means and said further switch means include gate controlled solid state switches, and means for selectively applying triggering signals to the gate electrodes of said plurality of switches during the motoring mode, speed responsive means for removing triggering signals from the said plurality solid state switches and triggering said further solid state switch when the dynamoelectric machine reaches a predetermined speed.

6. The excitation system according to claim 1 including a permanent magnet generator mounted on the same shaft as said dynamoelectric machine, means to rectify the output of said permanent magnet generator, and switching means to impress the rectified output voltage on the said field windings when the dynamoelectric machine is driven as a generator.

7. The excitation system according to claim 5 wherein each of said plurality of switching means comprises a pair of oppositely poled silicon controlled rectifiers.

8. The excitation system according to claim 1 wherein said field winding includes three winding sections, two of said winding sections being permanently connected, a first switch means for connecting one end of the remaining winding section to the junction of the permanently connected winding sections to connect the field windings in a polyphase connection during motor operation of the dynamoelectric machine, and further switch means to connect said one end of the remaining winding to the remaining end of one of said permanently connected winding sections to connect the field windings in series during generator operation of the dynamoelectric machine.

* * * * *